Feb. 27, 1951 F. FISCHER 2,543,623
METHOD OF MAKING MULTICOLOR PRINTING PLATES
Filed June 22, 1948
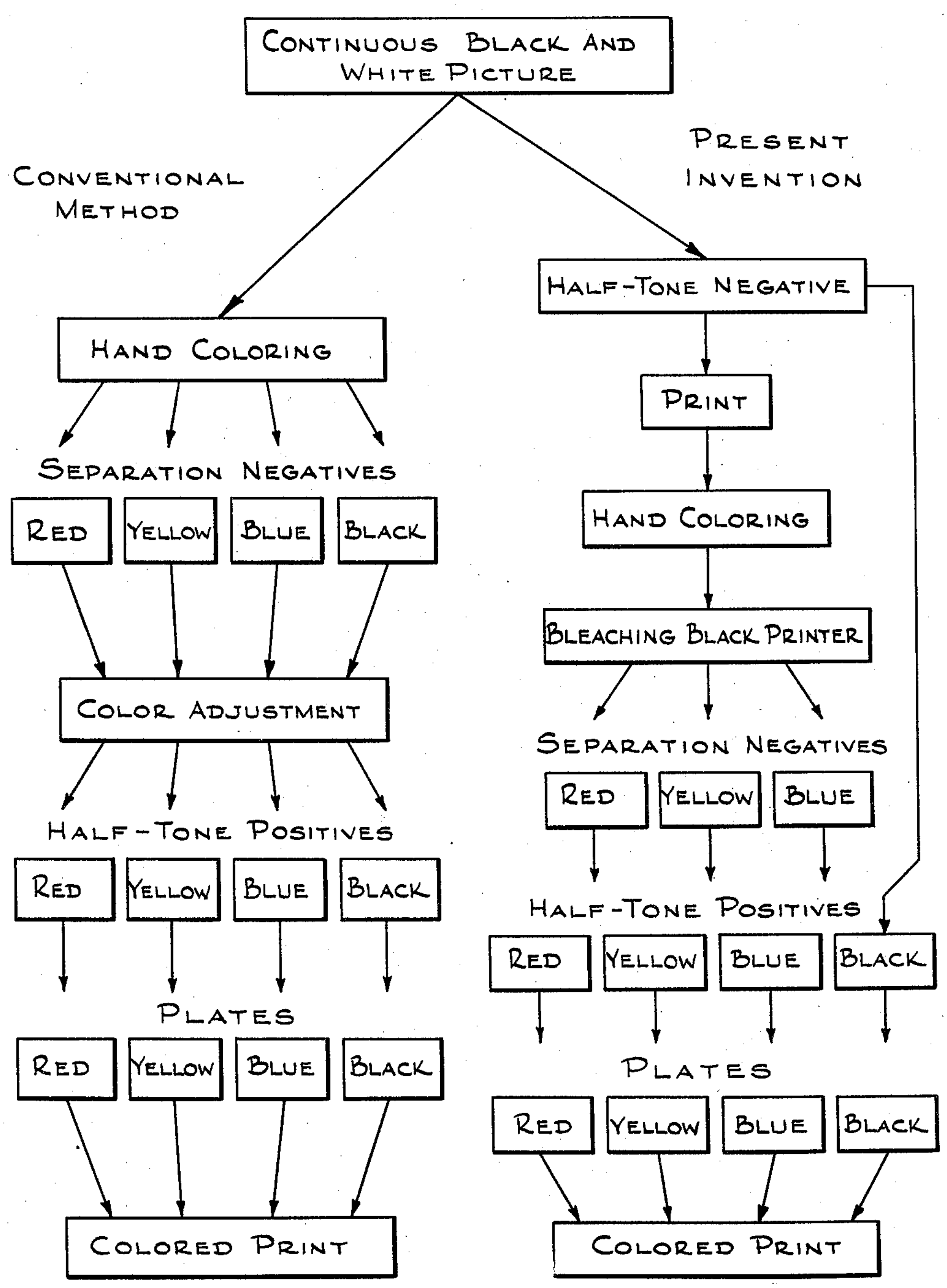
Frank Fischer Inventor
By Peter J. Gaylor Attorney Patented Feb. 27, 1951

2,543,623

UNITED STATES PATENT OFFICE 2,543,623

METHOD OF MAKING MULTICOLOR PRINTING PLATES

Frank Fischer, Somerville, N. J.

Application June 22, 1948, Serial No. 34,406

2 Claims. (Cl. 95—5.1)

This invention deals with color printing and, more specifically, to color printing which begins with a continuous-tone black-and-white picture, such as a photoprint or sketch.

As can be ascertained from the accompanying drawing, which diagrammatically depicts the main operations involved in conventional color printing methods and the method of the present invention, the first step in conventional color printing, after obtaining the continuous-tone black-and-white picture, is the coloring of the picture by hand with the proper colors, hues and shades desired. The next operation involves photographing the colored picture, with proper light filters, to produce four separation negatives for the colors red, yellow, blue and black. Although this is the conventional procedure, other combinations are sometimes employed, depending upon the demands imposed by the picture. In rare cases, half-tone separation negatives have been made at this point, but such technique is limited to low quality work, due to the extreme amount of color correction required in such cases.

After the continuous-tone separation negatives are obtained, the usual procedure thereafter is to make color adjustments on the separation negatives, since the black appears in all of them, resulting in mutual intensifying effects of the colors and the black. This is a time-consuming operation which requires the skill of an expert technician. Thereafter, half-tone positives are made from each of the four negatives. When color printing is to be done, printing plates are made from each of the positives and the picture is printed, using each plate with its proper colored ink.

When starting out with color sketches, rather than continuous-tone black-and-white pictures, the conventional technique involves making four continuous-tone separation negatives directly from the sketch by photography employing proper color filters. Thereafter, the procedure is the same as heretofore described.

One objection to this conventional technique is that four separation negatives are necessary, which takes up considerable time. Also, as pointed out heretofore, the black from the original continuous-tone print appears in all of the color separation negatives, thus interfering with color adjustment and requiring much time to overcome the effect of the black. This operation consumes more time than might be expected, due to the fact that it is often necessary to go back to the black separation negative and correct it due to mutual intensifying effects of the colors and the black.

In the present invention (as is apparent from the flowsheet shown in the drawing), the black separation negative is eliminated together with the time which it would normally consume and the concomitant effects which it would induce during the entire color correction procedure. According to this invention, the black-and-white continuous tone picture or photograph is immediately used for preparing a half-tone negative from which a silver emulsion print is made. This print is hand-colored with the proper colors and, thereafter, the black printer (or the black silver emulsion image originally made by the half-tone negative) is removed by bleaching preferably in a manner to be hereinafter set forth, leaving only the colors which were applied by hand. Some color balancing may be done at this point to obtain an improved color print.

The next operation is to make three separation negatives by photography, using light filters, the colors employed usually being red, yellow and blue. Since there is no effect of the black from the original print, only minor color adjustment need be made on these negatives or the positives made therefrom. A positive is also made from the original half-tone negative, and all four positives are then used to make the printing plates in the conventional manner.

The preferred bleaching operation for removing the (silicon emulsion) black printer, heretofore mentioned involves treating the colored half-tone print (after coloring) with a solution (preferably saturated) of mercury bichloride (corrosive sublimate) in a non-aqueous solvent, such as ether, dioxane, acetone, pyridine, and the like, by coating the complete surface of the print with the solution and allowing the solvent to evaporate, whereupon a uniform deposition of the mercury compound occurs on the print. Another bleaching method, which is not as satisfactory, involves dusting the finely divided mercuric chloride on the face of the print, care being taken to avoid contact with the skin and possible poisoning, since it is a cumulative poison. It is also possible to apply this dusting technique to bleaching agents which are water soluble or not soluble in non-aqueous solvents.

The next operation involves subjecting the coated print to the action of water vapor at elevated temperature. Steam is preferably employed at a temperature of 80° to 100° C., for a short period of time. The coated print is merely inserted in a stream of steam so that all of the surface has been contacted by the water vapor. It is to be understood, however, that lower temperatures with longer times of contact will give passable results. Water in liquid form is to be avoided, not only because of its washing effect upon the colors, but also because of paper distortion, as well as other disadvantages.

If the print is still soft due to high water vapor content, it is preferably dried in an oven or by standing in a dry atmosphere. Excess sublimate may be brushed off carefully, or otherwise removed by blowing or the like. Thereafter, the print is ready for the production of separation negatives, as outlined above, except that a black separation negative is not made.

As is apparent from the foregoing, not only is the trouble of preparing a fourth (black) separation negative avoided by the process of the present invention, but considerable time is also saved in eliminating color adjustment required when the black printer is present. Also a better quality print is obtained, particularly with respect to color balance.

The process of the present invention is even successfully applicable to air brush color work, since it does not cause bleeding of the deposited color film on such drawings. Also, when the customer is shown the hand-colored half-tone print produced in accordance with the present invention, he can be certain that the finished color print will resemble it closely in appearance, whereas such is not the case with the conventional process wherein the customer sees a colored continuous-tone print.

Although the discussion has been concentrated on the popular three-color printing, it is to be understood that the invention is not limited thereby, and is applicable to printing employing one, two or even four colors, and the processing is done in the same manner.

I claim:

1. In the process of producing a colored print from a continuous tone black-and-white picture, the improvement comprising the steps of making a half-tone black-and-white negative of said picture and a silver emulsion print on an opaque surface from said negative, hand coloring said print by applying colors directly on the emulsion coated surface of said print, bleaching out the black printer from said hand colored print, making color separation negatives from said bleached colored print, making half-tone positives from each of said separation negatives, making a half-tone positive of said half-tone black-and-white negative, making printing plates from the aforesaid half-tone positives, and printing the colored print therefrom.

2. The process according to claim 1 in which the bleaching out of the black printer is effected by treating the print with mercury bichloride dissolved in a substantially non-aqueous solvent, evaporating the solvent, and heating the print to 80° to 100° C. in presence of water vapor in the substantial absence of liquid water.

FRANK FISCHER.

REFERENCES CITED

The following references are of record in the file of this patent:

UNITED STATES PATENTS

| Number | Name | Date |
|---|---|---|
| 1,071,559 | Lewisohn | Aug. 26, 1913 |
| 1,272,521 | Powers | July 16, 1918 |
| 1,446 754 | Kohl | Feb. 27, 1923 |
| 1,661,079 | Nefgen | Feb. 28, 1928 |
| 1,669,869 | Farmer | May 15, 1928 |
| 1,974,334 | Kaufhold | Sept. 18, 1934 |
| 2,084,353 | McNett | June 22, 1937 |
| 2,183,143 | Marx | Dec. 12, 1939 |
| 2,278,114 | Murray | Mar. 31, 1942 |
| 2,304,942 | Marx | Dec. 15, 1942 |
| 2,319,079 | Murray | May 11, 1943 |

OTHER REFERENCES

Tobias: "Working Upsilver Prints"; pp. 30-38 Amer. Annual of Photography, 1930.

Certificate of Correction

Patent No. 2,543,623 February 27, 1951

FRANK FISCHER

It is hereby certified that error appears in the printed specification of the above numbered patent requiring correction as follows:

Column 2, line 30, for the word "silicon" read *silver*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*